Jan. 30, 1968     R. C. COLLINS     3,365,772
POWER DRIVEN ABRADING TOOL
Filed June 21, 1966
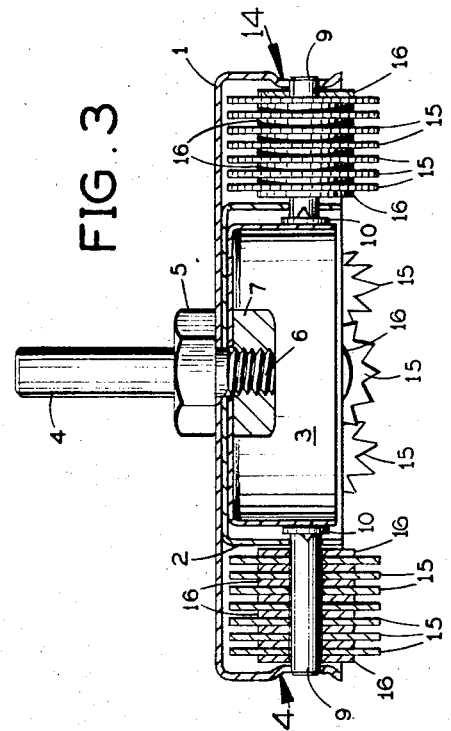
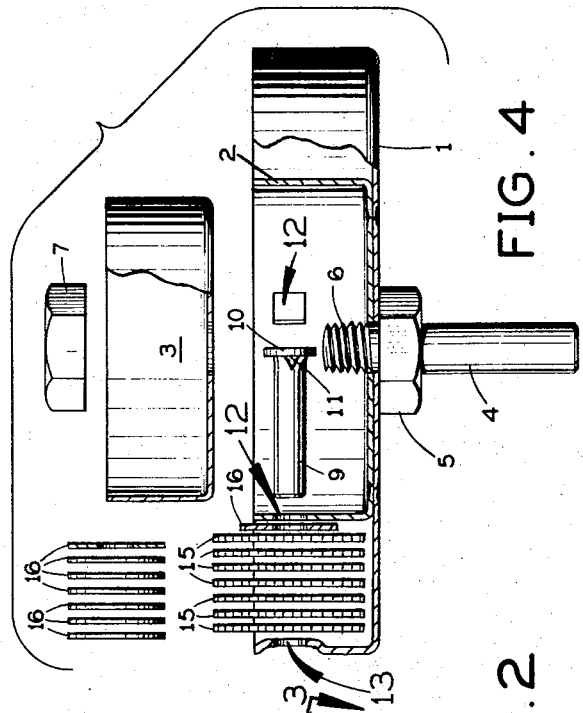
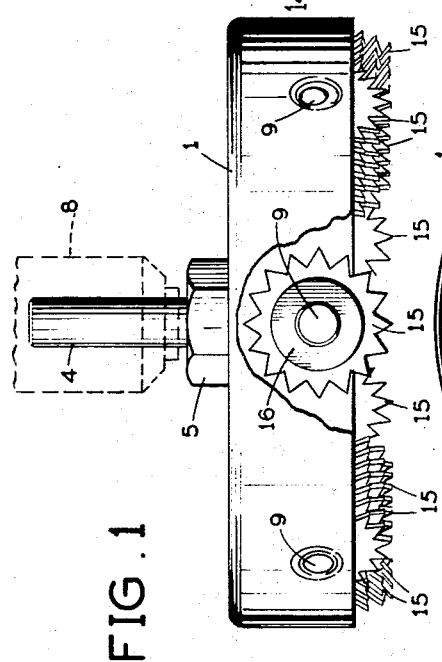
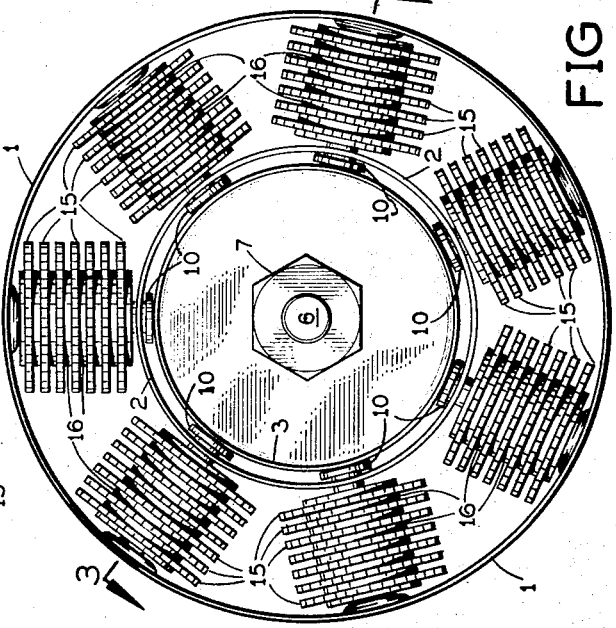
INVENTOR.
ROBERT C. COLLINS
BY
Lloyd Sanders 3,365,772
POWER DRIVEN ABRADING TOOL
Robert C. Collins, 746 NE. 67th St., Miami, Fla. 33138
Filed June 21, 1966, Ser. No. 559,315
5 Claims. (Cl. 29—81)

This invention relates in general to abrading devices and more particularly to a power driven abrading tool for abrading various surfaces when rotated by a conventional portable power drill, such as paint and rust removal, smoothing masonry and like operations.

Prior devices of this general character employ various types of universal coupling means between the abrading portion of the device and the shank for connection to a power rotated chuck means, which flexibility has proved to be unsatisfactory for certain specific operations.

Furthermore, in general, it has been difficult to replace worn abrading discs in prior devices because of excessive complication and the requirement of special disassembly tools.

The present invention overcomes the above objections and disadvantages by the provision of a plurality of nested open bottom coaxially positioned cylindrical cups through which is rigidly secured a coaxial spindle having a shank portion for engagement in a power driven chuck. The complete disassembly of the device for the replacement of worn abrading members is accomplished in a simple manner by the removal of a single master nut from the aforesaid spindle.

These and other objects and advantages in one embodiment of the invention are shown and described in the following specification and drawing, in which:

FIG. 1 is a side elevation of the abrading tool with a portion thereof broken away.

FIG. 2 is a bottom plan view of the tool shown in FIG. 1.

FIG. 3 is a cross sectional side elevation taken through section line 3—3, FIG. 2.

FIG. 4 is a fragmentary exploded view showing the principal elements of the tools shown in FIGS. 1-3.

Referring to the figures, three cylindrical cups 1, 2 and 3 are retained in predetermined coaxial spaced relation about a common principal axis, as shown, by a central cylindrical spindle member with a shank 4 having an integral hex shoulder portion 5 with a threaded inner end 6 engaged by a conventional hex nut 7, best shown in FIG. 3.

The shank member 4 is intended to be secured in a conventional chuck 8 for rotation thereby, illustrated by dotted lines in FIG. 1. Seven cylindrical axles 9 are each provided with a head 10 on one end thereof and a rectangular under portion 11, best shown in FIG. 4, for preventing rotation of the axle.

Each of the seven axles are positioned in uniform spaced radial relation to the axis of spindle 4, as shown in FIG. 2, with the head of each axle positioned between cups 2 and 3 and the square position 11 of each engaged in each of the seven square holes 12 in cup 2, as illustrated in FIG. 4, with the outer end of each axle 9 retained in a corresponding hole 13 which is centrally positioned in each circular depressed areas 14, in cup 1, best shown in FIG. 3. A plurality of multi-pointed abrading discs 15, preferably made from hardened steel, or other high wear resistant alloy, are journalled for coaxial rotation on each axle 9 and retained in spaced relation, as shown, by washers 16.

In operation, it is apparent that when the shank 4 is held in a suitable chuck and rotated about its axis, the lower edges of all discs 15 are substantially coplanar and will rotate and abrade any surface in contact therewith.

It is to be noted that the axles 9 are prevented from rotating by the engagement of the square portion under each head thereof engaged in the square holes in the second cup. However, equivalent keying may be accomplished by any one of several other well known means.

It is also to be noted that the outer end of each axle 9 is securely retained in cup 1 within each area 14 without projecting therefrom for preventing damage when the outer surface of cup 1 contacts a surface vertical to that being abraded.

It is well known that the discs 15 are subject to wear and require replacement and to this end this construction is particularly adapted, since the replacement of the discs is readily made by removing nut 7 and cup 3, which will permit the free inward extraction of each axle 9, thus releasing the worn discs 15 and their spacing washers 16 for the simple replacement of the former. The re-insertion of each axle 9 through new discs and the washers and the replacement of cup 3 and nut 7 complete the re-assembly of the device.

It is understood that certain modifications in the construction, utilizing the features above described, are intended to come within the scope of the appended claims.

Having described my invention, I claim:

1. An abrading device for engagement in a power driven chuck comprising an outer cylindrical cup having an aperture in the end thereof coaxial with the principal axis of said cup, a second cylindrical cup of predetermined diameter nested within said outer cup providing a space of predetermined uniform width between the outer wall thereof and the inner wall of said outer cup and having a coaxial like aperture in the end thereof, a third cylindrical cup having a like aperture therein coaxial therewith and coaxial with said axis nested within said second cup with a predetermined space of uniform width between the outer wall thereof and the inner wall of said second cup, a spindle means with the inner end portion thereof projecting through each of said coaxial apertures in each of said cups including a fastening means on the said inner end portion for holding the ends of each of said cups in secure adjacent relation with the outer end portion of said spindle means terminating in a shank coaxial with said axis for engagement in said power driven chuck, a plurality of axles positioned in coaxial radial apertures through the walls of said second and outer of said cups with the axes thereof in equi-spaced radial relation to the said principal axis and in a plane normal thereto, each of said axles having an integral head thereon positioned in the said space between said second and third cup for securing each of said axles in equal fixed longitudinal relation with respect to said principal axis, a plurality of like abrading disc means journalled for rotation on each of said axles in the space between said outer and said second cup and projecting therefrom whereby the said disc means will rotate and abrade a surface when in contact therewith when said shank means is rotated.

2. In an abrading device of the character described a cylindrical outer cup having an aperture through its end coaxial with the principal axis of said cup, a second cylindrical cup coaxially nested in said outer cup with the wall thereof in predetermined spaced relation from the wall of said outer cup and a second aperture coaxially through the end thereof, a spindle means having an inner end portion extending through each said aperture and secured therein for holding each said end in fixed adjacent relation with the outer portion of said spindle formed into a cylindrical shank coaxial with said principal axis, a plurality of axles positioned in coaxial radial apertures through said walls of said second and said outer cup with the axes thereof in spaced radial relation to said principal axis and in a plane normal thereto, means associated with said second cup for securing said axles in equal longitudinal relation with respect to said principal axis, a plurality of like abrading disc means journalled for rotation on each of said axles in the space between said outer and said second cup whereby said disc means will rotate and abrade a surface when in contact therewith when said shank is rotated.

3. In an abrading device of the character described a cylindrical outer cup having a spindle aperture through its end coaxial with the principal axis of said cup, a second cylindrical cup having a said spindle aperture coaxially positioned in the end thereof nested in said outer cup with the wall thereof in predetermined uniform spaced relation from the wall of said outer cup, a spindle means positioned through each said spindle aperture and coaxial with said principal axis including a detachable fastening means at one end portion thereof for securing each said end of each said cup in adjacent relation on said spindle means with the opposite end portion thereof forming a shank for engagement in a power driven chuck, the wall of said outer cup having a predetermined plurality of like circular holes therethrough in predetermined spaced radial relation to said principal axis and aligned in a plane normal thereto, a like plurality of keyed holes in said second cylindrical cup corresponding with said first mentioned holes in like radial and normal relation with respect to said principal axis, an axle having a head on one end thereof slidable positioned through each corresponding radial pair of said holes and corresponding apertures with the head adjacent the inner surface of the wall of said second cup, a key means adjacent the under side of the said head of each said axle engaged with each corresponding said keyed aperture for preventing the rotation of each said axle, a plurality of like abrading disc means journalled for rotation on each of said axles in the space between the wall of said outer cup and the wall of said second cup whereby said disc means will rotate and abrade a surface when in contact therewith when said shank is secured in a chuck means and rotated thereby.

4. The construction recited in claim 3 including a third cylindrical cup coaxially nested within said second cup and having a central second aperture in the end thereof engaged with said spindle means for securing the end of said third cup against the said end of said second cup, said third cup having the wall thereof positioned in close proximity to the said head of each said axle for retaining the latter in said second and outer cups.

5. The construction recited in claim 3 including an inward axial extruded area of predetermined size and depth surrounding each of said holes for enlarging the dimension tolerances required in said outer cup and each said axle for preventing the outer end of each of the latter from extending beyond the outer periphery of said outer cup and engagement therethrough.

References Cited
UNITED STATES PATENTS

| 1,230,842 | 6/1917 | Berg | 125—5 |
| 1,377,537 | 5/1921 | Wimmer | 29—81 |
| 1,498,224 | 6/1924 | Atwood | 125—5 |
| 1,581,699 | 4/1926 | Sturrock | 125—5 |
| 1,756,734 | 4/1930 | Emminger | 125—5 |
| 3,309,729 | 3/1967 | Dresser | 125—5 X |

FOREIGN PATENTS

| 409,194 | 4/1934 | Great Britain. |

LOUIS O. MAASSEL, *Primary Examiner.*